United States Patent Office 3,326,628
Patented June 20, 1967

3,326,628
VAT DYEING WITH ETHYLENE UREA-FORM-ALDEHYDE TYPE RESIN TREATMENT
Oskar Olaj, Vienna, Austria, and Alfred Berger, Basel, Arthur Maeder, Therwil, and Paul Schaefer, Riehen, Switzerland, assignors to Ciba Limited, Basel, Switzerland, a Swiss company
No Drawing. Filed June 21, 1963, Ser. No. 289,733
5 Claims. (Cl. 8—34)

The condensation of 1 molecular proportion of ethylene urea with 1 molecular proportion of formaldehyde in an aqueous acid solution is known (cf. Makromolekulare Chemie, 15 [1955], page 88); it gives rise to linear products corresponding to the general formula

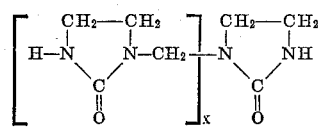

where $x$ is 4 to 5.

Similar linear polymers, namely the corresponding N:N'-dimethylol compounds, are obtained by eliminating water from dimethylol urea. It has now been found that particularly valuable condensation products of ethylene urea and aldehydes are obtained by performing the condensation in the presence of a small amount of other higher-functional compounds.

The present invention provides a process for the manufacture of polymeric, water-soluble condensation products of ethylene urea and aldehydes, wherein ethylene urea is reacted with a monoaldehyde in the presence of a higher-functional compound in an aqueous solution, at least the final stage of the process being conducted under acid conditions.

Particularly suitable monoaldehydes are aliphatic monoaldehydes such as formaldehyde, acetaldehyde, acrolein and benzaldehyde.

The term "higher-functional compounds" refers to water-soluble low-molecular aliphatic compounds that contain at least 3 free hydrogen atoms and are capable of reacting with aldehydes and have a molecular weight of at most 150. Relevant compounds are, above all, carbamides such as urea, acetylene diurea, biuret and condensation products of urea with diamines; further suitable compounds are salts of polyamines such as ethylenediamine and polyaldehydes such as glyoxal, hydroxyadipaldehyde and malonaldehyde.

The proportions in which the starting materials are used are advantageously chosen so as to assure the presence of 0.7 to 1.8 molecular proportions of aldehyde and 0.01 to 0.8 molecular proportion of higher-functional compound per molecular proportion of ethylene urea. Instead of a unitary starting material a mixture of different substances may be used. Thus, it is often of advantage to use a mixture of formaldehyde and acrolein.

The condensation is generally performed in a single stage under acid conditions in an aqueous solution. It is of advantage to drop the aldehyde into the mixture of ethylene urea and higher-functional compound at a temperature ranging from 20 to 90° C., advantageously, from 30 to 40° C., whereupon the mixture is stirred for ½ hour to 2 hours at a temperature raised by about 10° C. Alternatively, the methylol or dimethylol compound may be preformed in a first stage in a neutral or weakly alkaline medium and then subjected to acid condensation in a second stage. As a rule, the reaction solution is then neutralized, heated and while still hot freed by filtration from any undissolved material. To obtain the condensate the solution is evaporated. In some cases it is not necessary to isolate the condensate; it is used in the form of the aqueous solution or paste as it is obtained.

The condensation products manufactured by the present process are especially suitable as levelling agents for dyeing cotton with vat dyestuffs. The resulting dyeings are level and the dyestuff exhaustion is very good. Otherwise, the condensation products of the invention may be used whenever patchy dyeings may occur or are already present owing to the dyestuff and/or material concerned. Thus, for example, the condensates may be added to the dyebath so that they can develop their levelling activity during the dyeing operation. It is also possible to level patchy vat dyeings subsequently with the aid of the condensates in an alkaline bath containing hydrosulfite.

Example 1

1 mol (86 g.) of ethylene urea and 0.02 mol (2.8 g.) of acetylene diurea are dispersed in 500 ml. of water and mixed with 5 ml. of 2 N-hydrochloric acid. To improve the solubility the batch may be heated to about 80° C. and then cooled to 30–35° C. 1.04 mols (31.2 g) for formaldehyde in the form of a solution of 37% strength are then added dropwise to the clear solution within 20 to 30 minutes, and the mixture is stirred for 1 hour at the same temperature and for 30 minutes at 40 to 45° C. On completion of the reaction the mixture is neutralized with about 10 ml. of N-sodium hydroxide solution, heated, and while still hot freed by filtration from a small amount of undissolved material, to yield a solution containing 17% of the condensation product.

Further examples of the manufacture of such condensates are described in the following table:

| Example | Ethylene urea mols | Plus mols of— | Plus mols of— |
|---|---|---|---|
| 1 | 9.8 | 10.2 formaldehyde | 0.2 acetylene diurea. |
| 2 | 9.6 | 10 formaldehyde | 0.4 urea. |
| 3 | 9.2 | 7.4 formaldenhyde | 3.0 acrolein and 0.8 urea. |
| 4 | 9.8 | 10.2 acetaldehyde | 0.2 urea. |
| 5 | 9.6 | 7.0 acetaldehyde | 0.4 urea. |
| 6 | 6.0 | 10.0 acetaldehyde | 4.0 dicyandiamide. |
| 7 | 10.2 | 9.8 formaldehyde | 0.2 glyoxal. |
| 8 | 9.8 | 10.2 formaldehyde | 0.2 diethylene triamine hydrochloride. |

Example 2

A dyebath is prepared which contains per liter 16 ml. of sodium hydroxide solution of 30% strength, 1 g. of sodium hydrosulfite and in each case one of the new condensation products according to Example 1 and a vat dyestuff obtained by sulfur melting from methylbenzanthrone. At intervals of 10 minutes, at a bath temperature of 60 to 65° C., two pieces of cotton satin are immersed and moved about in the dyebath. The goods-to-liquor ratio is 1:80. After another 50 minutes the pieces of satin are removed from the dyebath and the vat dyeing is developed in the usual manner. The pieces of satin are dried and ironed and then measured with a brightness measuring instrument according to Dr. Lange with polydisperse light against barium sulfate as standard (=100).

All figures in the following table are referred to a levelling agent concentration of 0.5 g. of active substance per liter of condensate. Column A shows the brightness of the first satin sample after having been dyed in the presence of the levelling agent concerned, whereas column B gives the brightness of the first sample without addition of a levelling agent. The smaller the difference (A–B) between the figures in the two columns, the better is the dyestuff exhaustion or the smaller is the retentive effect respectively. Finally, column C gives the difference in brightness between the first and the second sample of satin, that is to say it is a measure of the levelling effect.

The smaller this difference, the better is the levelling effect of the agent used.

|        | A  | B  | C  |
|--------|----|----|----|
| No. 1  | 20 | 13 | 5  |
| No. 2  | 19 | 14 | 6  |
| No. 3  | 19 | 13 | 5  |
| No. 4  | 25 | 13 | 4  |
| No. 5  | 18 | 13 | 5  |
| No. 6  | 19 | 13 | 6  |
| No. 7  | 19 | 14 | 6  |
| No. 8  | 20 | 13 | 4  |
| I      | 15 | 13 | 10 |

I refers to a condensation product obtained without addition of a higher-functional compound, namely from 1 mol of ethylene urea and 0.9 mol of formaldehyde. The dyestuff exhaustion achieved with this product may be classified as better, but the levelness of the dyeings is poor.

*Example 3*

A mixture of 82.5 g. (0.96 mol) of ethylene urea, 2.4 g. (0.04 mol) of urea, and 81 g. (1 mol) of formaldehyde of 37% strength (which has been adjusted with sodium hydroxide solution to pH=8) is heated to about 40° C., whereupon reaction sets in and the temperature rises by a few degrees. After about 30 minutes the batch is cooled to 30° C. and the reaction mixture—which contains the methylol or dimethylol compound and starting material—is mixed within 30 minutes with a mixture of 124 g. of water and 10 ml. of N-hydrochloric acid.

The batch is stirred for 1 hour at 30° C. and then for 30 minutes at 40–45° C., then heated, and traces of undissolved material are filtered off while the batch is still hot.

After cooling a paste is obtained which contains about 28% of the condensation product; it is readily soluble in hot water.

What is claimed is:

1. A process for producing level dyeings on textile fibers with vat dyestuffs wherein dyeing is carried out in an aqueous dyeing bath and in the presence of a water-soluble condensation product being dissolved in said dyeing bath which product is obtained by condensation in aqueous solution of (1) one molecular proportion of ethylene eurea with (2) 0.7 to 1.8 molecular proportions of a monoaldehyde selected from the group consisting of formaldehyde, acetaldehyde, acrolein and mixtures thereof and with (3) 0.01 to 0.8 molecular proportion of a compound selected from the group consisting of urea, acetylene diurea and dicyandiamide, at least the final stage of the condensation being performed under acid conditions.

2. A process for producing level dyeings on cotton with vat dyestuffs wherein dyeing is carried out in an aqueous dyeing bath and in the presence of a water-soluble condensation product being dissolved in said dyeing bath which product is obtained by condensation in aqueous solution of (1) one molecular proportion of ethylene urea with (2) 0.7 to 1.8 molecular proportions of a monoaldehyde selected from the group consisting of formaldehyde, acetaldehyde, acrolein and mixtures thereof and with (3) 0.01 to 0.8 molecular proportion of a compound selected from the group consisting of urea, acetylene diurea and dicyandiamide, at least he final stage of the condensation being performed under acid conditions.

3. A process for producing level dyeings on textile fibers with vat dyestuffs wherein dyeing is carried out in the presence of a water soluble condensation product which product is obtained by condensation in aqueous solution of (1) one molecular proportion of ethylene urea with (2) 0.7 to 1.8 molecular proportions of formaldehyde and with (3) 0.01 to 0.8 molecular proportion of urea, at least the final stage of the condensation being performed under acid conditions.

4. A process for producing level dyeings on textile fibers with vat dyestuffs wherein dyeing is carried out in the presence of a water soluble condensation product which product tis obained by condensation in aqueous solution of (1) one molecular proportion of ethylene urea with (2) 0.7 to 1.8 molecular proportions of formaldehyde and with (3) 0.01 to 0.8 molecular proportion of acetylene diurea, at least the final stage of the condensation being performed under acid conditions.

5. A process for producing level dyeings on textile fibers with vat dyestuffs wherein dyeing is carried out in the presence of a water soluble condensation product which product is obtained by condensation in aqueous solution of (1) one molecular proportion of ethylene urea with (2) 0.7 to 1.8 molecular proportions of formaldehyde and with (3) 0.01 to 0.8 molecular proportion of dicyandiamide, at least the final stage of the condensation being performed under acid conditions.

References Cited

UNITED STATES PATENTS 2,169,546   8/1939   Widmer.
2,881,152   4/1959   Conn _____ 260—70 X

FOREIGN PATENTS 834,393   5/1960   Great Britain.

OTHER REFERENCES

Blais, Amino Resins, Reinhold Pub. N.Y.C. pp. 153–157 TS 986 A5 B55 pub. 1959.

Diserens, The Chemical Technology of Dyeing and Printing, pp. 14–15 2nd Edition 1948, pub. by Reinhold Publishing Corp., N.Y.C. TP 893 D 49 pE.

NORMAN G. TORCHIN, *Primary Examiner.*

D. LEVY, *Assistantt Examiner.*